US012777221B2

(12) United States Patent
Uchimura

(10) Patent No.: US 12,777,221 B2
(45) **Date of Patent: *Oct. 27, 2026**

(54) REPRODUCING DEVICE, REPRODUCING METHOD, PROGRAM, AND TRANSMITTING DEVICE

(71) Applicant: SONY CORPORATION, Tokyo (JP)

(72) Inventor: Kouichi Uchimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/979,867

(22) Filed: Dec. 13, 2024

(65) Prior Publication Data

US 2025/0113080 A1 Apr. 3, 2025

Related U.S. Application Data

(63) Continuation of application No. 18/452,113, filed on Aug. 18, 2023, now Pat. No. 12,170,809, which is a continuation of application No. 17/680,640, filed on Feb. 25, 2022, now Pat. No. 11,736,759, which is a continuation of application No. 16/360,633, filed on
(Continued)

(51) Int. Cl.

| | |
|---|---|
| ***H04N 21/435*** | (2011.01) |
| ***H04N 5/445*** | (2011.01) |
| ***H04N 7/088*** | (2006.01) |
| ***H04N 21/431*** | (2011.01) |
| ***H04N 21/485*** | (2011.01) |
| ***H04N 21/488*** | (2011.01) |
| ***H04N 21/643*** | (2011.01) |

(52) U.S. Cl.

CPC ..... *H04N 21/4355* (2013.01); *H04N 5/44504* (2013.01); *H04N 7/0882* (2013.01); *H04N 7/0885* (2013.01); *H04N 21/4318* (2013.01); *H04N 21/4858* (2013.01); *H04N 21/4884* (2013.01); *H04N 21/64322* (2013.01)

(58) Field of Classification Search

None

See application file for complete search history.

(56) References Cited

U.S. PATENT DOCUMENTS

| | | | |
|---|---|---|---|
| 6,061,056 | A | 5/2000 | Menard et al. |
| 6,373,526 | B1 | 4/2002 | Kessler et al. |

(Continued)

FOREIGN PATENT DOCUMENTS

| | | | |
|---|---|---|---|
| CN | 1735177 | A | 2/2006 |
| CN | 1856036 | A | 11/2006 |

(Continued)

OTHER PUBLICATIONS

International Search Report issued Jun. 24, 2014 in PCT/JP2014/058159 (with English translation).

(Continued)

*Primary Examiner* — Alexander Q Huerta

(74) *Attorney, Agent, or Firm* — Oblon, McClelland, Maier & Neustadt, L.L.P.

(57) ABSTRACT

A transmitting apparatus including circuitry configured to generate caption data corresponding to content data and having elements defined in Extensible Markup Language (XML), and output the content data and the generated caption data to a reproducing device.

21 Claims, 13 Drawing Sheets

Related U.S. Application Data

Mar. 21, 2019, now abandoned, which is a continuation of application No. 15/715,854, filed on Sep. 26, 2017, now Pat. No. 10,313,741, which is a continuation of application No. 14/868,036, filed on Sep. 28, 2015, now Pat. No. 9,807,449, which is a continuation of application No. 13/937,702, filed on Jul. 9, 2013, now Pat. No. 9,173,004.

(60) Provisional application No. 61/807,926, filed on Apr. 3, 2013.

(56) References Cited

U.S. PATENT DOCUMENTS

| | | | | |
|---|---|---|---|---|
| 7,702,220 | B2 | 4/2010 | Tsujii et al. | |
| 8,350,964 | B2 | 1/2013 | Yamazaki et al. | |
| 8,619,192 | B2 | 12/2013 | Smith et al. | |
| 9,173,004 | B2 | 10/2015 | Uchimura | |
| 11,736,759 | B2 * | 8/2023 | Uchimura | H04N 5/44504 725/136 |
| 12,170,809 | B2 * | 12/2024 | Uchimura | H04N 7/0882 |
| 2002/0122136 | A1 * | 9/2002 | Safadi | H04N 21/4117 348/468 |
| 2003/0005458 | A1 | 1/2003 | Mori | |
| 2004/0252234 | A1 * | 12/2004 | Park | H04N 21/4884 348/468 |
| 2005/0149973 | A1 | 7/2005 | Fang | |
| 2006/0184994 | A1 | 8/2006 | Eyer | |
| 2006/0239591 | A1 | 10/2006 | Kim et al. | |
| 2006/0245806 | A1 | 11/2006 | Furuse et al. | |
| 2007/0121005 | A1 | 5/2007 | Gutta | |
| 2007/0154171 | A1 | 7/2007 | Elcock et al. | |
| 2007/0180460 | A1 * | 8/2007 | Park | H04N 21/485 725/132 |
| 2007/0300249 | A1 | 12/2007 | Smith et al. | |
| 2008/0056663 | A1 | 3/2008 | Tsujii et al. | |
| 2008/0107397 | A1 * | 5/2008 | Kang | H04N 5/9206 386/245 |
| 2008/0129864 | A1 * | 6/2008 | Stone | H04N 21/4782 348/E7.091 |
| 2008/0279535 | A1 * | 11/2008 | Haque | H04N 21/435 386/E5.042 |
| 2009/0129749 | A1 | 5/2009 | Oyamatsu et al. | |
| 2009/0278986 | A1 | 11/2009 | Ikegami | |
| 2009/0316046 | A1 | 12/2009 | Yamazaki et al. | |
| 2010/0020234 | A1 * | 1/2010 | Smith | H04N 21/485 348/E7.001 |
| 2010/0033624 | A1 | 2/2010 | Smith et al. | |
| 2010/0066915 | A1 | 3/2010 | Mori et al. | |
| 2010/0098389 | A1 | 4/2010 | Shimada | |
| 2010/0122257 | A1 | 5/2010 | Wada | |
| 2010/0183278 | A1 | 7/2010 | Black et al. | |
| 2010/0186081 | A1 | 7/2010 | Kawate | |
| 2010/0188573 | A1 | 7/2010 | Kuusiholma et al. | |
| 2010/0332214 | A1 | 12/2010 | Shpalter et al. | |
| 2011/0035423 | A1 | 2/2011 | Kobayashi et al. | |
| 2011/0164673 | A1 | 7/2011 | Shaffer | |
| 2011/0187823 | A1 | 8/2011 | Ueda | |
| 2012/0311628 | A1 * | 12/2012 | Gilson | H04N 21/2358 725/32 |
| 2012/0320267 | A1 | 12/2012 | Landow | |
| 2013/0002833 | A1 | 1/2013 | Card, II | |
| 2013/0076981 | A1 | 3/2013 | Labrozzi et al. | |
| 2013/0169762 | A1 | 7/2013 | Kanemaru et al. | |
| 2013/0208187 | A1 | 8/2013 | Bhogal et al. | |
| 2013/0212116 | A1 | 8/2013 | Filliettaz, III | |
| 2013/0242114 | A1 | 9/2013 | Polumbus et al. | |
| 2013/0302014 | A1 | 11/2013 | Uchimura | |
| 2014/0109157 | A1 | 4/2014 | Kellicker | |
| 2014/0109158 | A1 | 4/2014 | Kellicker | |
| 2014/0282711 | A1 | 9/2014 | Xiong et al. | |
| 2014/0300812 | A1 | 10/2014 | Uchimura | |
| 2017/0054943 | A1 | 2/2017 | Einarsson | |

FOREIGN PATENT DOCUMENTS

| | | | |
|---|---|---|---|
| JP | 2009-088634 | A | 4/2009 |
| WO | WO 2012/111513 | A1 | 8/2012 |

OTHER PUBLICATIONS

Glenn Adams, et al., "Timed text markup language 1 (TTML1)", World Wide Web Consortium (W3C), Second Edition, Retrieved on Jun. 16, 2014 from URL: http://www.w3.org/TR/2013/WD-ttaf1-dfxp/, Sep. 24, 2013, 217 Pages.

https://www.smpte.org/sites/default/files/st2052-1-2010.pdf. Dec. 3, 2010 https://www.smpte.org/sites/default/files/rp2052-10-2012.pdf. Jan. 3, 2012.

Office Action issued on Feb. 6, 2018 in Japanese Patent Application No. 2015-510011 (with English translation).

Combined Chinese Office Action and Search Report issued Jan. 4, 2018 in corresponding Patent Application No. 201480018614.0 (with English translation), 18 pages.

Office Action issued in Chinese Patent Application No. 201480018614.0 dated Jun. 5, 2018 with English translation,.

Dolan, M., et al., "Timed Text Markup Language (TTML) 1.0 (Second Edition)", W3C Working Draft, Jan. 31, 2013, 303 pages.

Office Action issued Sep. 11, 2018 in corresponding Japanese Patent Application No. 2015-510011, 5 pages.

"SMPTE Recommended Practice—Conversion from CEA-708, Caption Data to SMPTE-TT", RP 2052-11:2013, SMPTE, Jun. 5, 2013, 23 page.

Glenn Adams, "Timed Text Markup Language 1(TTML1)", (Second Edition), W3C Recommendation Sep. 24, 2013, W3C (World Wide Web Consortium), 9. 3. 2 Intermediate Synchronic Document, Jan. 31, 2013, 242 pages.

* cited by examiner

FIG. 7

```
<?xml version="1.0" encoding="UTF-8"?>
<tt xmlns="http://www.w3.org/ns/ttml" xmlns:tts="http://www.w3.org/ns/ttml#styling" xmlns:ttp="http://www.w3.org/ns/
ttml#parameter" xml:lang="en-US"  tts:extent="1920px 1080px">
 <head>
  <layout>
    <region xml:id="r1" tts:backgroundColor="red" tts:showBackground="always" tts:origin="0% 0%" tts:extent="100%
100%"/>
  </layout>
 </head>
 <body tts:backgroundColor="transparent">
  <div   tts:fontStyle="italic"   tts:textOutline="red   3%"   tts:textDecoration="underline"   tts:fontWeight="bold"
tts:backgroundColor="green" tts:fontSize="45px">
   <p region="r1" begin="00:00:01:00" end="00:00:02:00" tts:backgroundColor="blue">1</p>
   <p region="r1" begin="00:00:02:00" end="00:00:03:00" tts:backgroundColor="cyan">2</p>
   <p region="r1" begin="00:00:03:00" end="00:00:04:00" tts:backgroundColor="magenta">3</p>
   <p region="r1" begin="00:00:04:00" end="00:00:05:00" tts:backgroundColor="white">4</p>
   <p region="r1" begin="00:00:05:00" end="00:00:06:00" tts:backgroundColor="yellow">5</p>
   <p region="r1" begin="00:00:06:00" end="00:00:07:00" tts:backgroundColor="black">6</p>
   <p region="r1" begin="00:00:07:00" end="00:00:08:00" tts:backgroundColor="white">7</p>
  </div>
 </body>
</tt>
```

FIG. 8

```
<region xml:id="r1" tts:backgroundColor="red" tts:showBackground="always" tts:origin="0% 0%"
tts:extent="100% 100%"/>
 <body tts:backgroundColor="transparent">
  <div tts:fontStyle="italic" tts:textOutline="red 3%" tts:textDecoration="underline" tts:fontWeight="bold"
tts:backgroundColor="green" tts:fontSize="45px">
   <p region="r1" begin="00:00:06:00" end="00:00:07:00" tts:backgroundColor="black">6</p>
  </div>
 </body>
</region>
```

FIG. 9

```
<region xml:id="r1" tts:backgroundColor="red" tts:showBackground="always" tts:origin="0% 0%"
tts:extent="100%    100%"/    tts:displayAlign=" before"  tts:opacity=" 1.0"  tts:padding=" 0px"
tts:writingMode=" lrtb" />
 <body tts:backgroundColor="transparent" >
  <div     tts:fontStyle="italic"  tts:textOutline="red    3%"     tts:textDecoration="underline"
tts:fontWeight="bold" tts:backgroundColor="green" tts:fontSize="45px">
  <p     region="r1"     begin="00:00:06:00"   end="00:00:07:00"     tts:backgroundColor="black"
tts:fontStyle="italic" tts:textOutline="red 3%" tts:textDecoration="underline" tts:fontWeight="bold"
tts:backgroundColor="green"          tts:fontSize="45px"  tts:direction=" ltr"      tts:lineHeight=" normal"
tts:textAlign=" start" tts:unicodeBidi=" normal"  tts:color=" white"  tts:fontFamily=" default" >6</p>
  </div>
 </body>
</region>
```

FIG.10

```
<region xml:id="r1" tts:backgroundColor="red" tts:showBackground="always" tts:origin="0px 0px" tts:extent="1920px
1080px" tts:displayAlign=" before" tts:opacity=" 1.0" tts:padding=" 0px 0px 0px 0px" tts:writingMode=" lrtb" />
 <body tts:backgroundColor="transparent" >
  <div tts:fontStyle="italic" tts:textOutline="red   1.35px"   tts:textDecoration="underline"   tts:fontWeight="bold"
tts:backgroundColor="green" tts:fontSize="45px">
   <p region="r1"   begin="00:00:06:00"   end="00:00:07:00"   tts:backgroundColor="black"   tts:fontStyle="italic"
tts:textOutline="red   1.35px"   tts:textDecoration="underline"   tts:fontWeight="bold"   tts:backgroundColor="green"
tts:fontSize="45px"   tts:direction=" ltr"     tts:lineHeight=" 45px"     tts:textAlign=" start"     tts:unicodeBidi=" normal"
tts:color=" white" tts:fontFamily=" default" >6</p>
  </div>
 </body>
</region>
```

FIG. 11

```
<region xml:id="r1" tts:backgroundColor="#00000000" tts:showBackground="always" tts:origin="0px 0px"
tts:extent="1920px 1080px" tts:displayAlign=" before" tts:opacity=" 1.0" tts:padding=" 0px 0px 0px 0px"
tts:writingMode=" lrtb" />
 <body tts:backgroundColor="#00000000" >
  <div tts:fontStyle="italic" tts:textOutline="red 1.35px" tts:textDecoration="underline" tts:fontWeight="bold"
tts:backgroundColor="#00000000" tts:fontSize="45px">
   <p    region="r1"    begin="00:00:06:00"    end="00:00:07:00"    tts:backgroundColor="#00000000"
tts:fontStyle="italic" tts:textOutline="red   1.35px"   tts:textDecoration="underline"   tts:fontWeight="bold"
tts:backgroundColor="green" tts:fontSize="120px"  tts:direction=" ltr"  tts:lineHeight=" 120px"  tts:textAlign=" start"
tts:unicodeBidi=" normal" tts:color="  #ff0000ff" tts:fontFamily=" default" >6</p>
  </div>
 </body>
</region>
```

FIG. 12

```
<region xml:id="r1" tts:backgroundColor="#00000000" tts:showBackground="always" tts:origin="0px
0px" tts:extent="1920px 1080px" tts:displayAlign=" before"  tts:opacity=" 1.0"  tts:padding=" 0px 0px 0px
0px"  tts:writingMode=" lrtb"    presentation=" painton"  presentationrate=" auto" />
 <body tts:backgroundColor="#00000000" >
  <div tts:fontStyle="italic" tts:textOutline="red 1.35px" textEdge=" raised"  tts:textDecoration="underline"
tts:fontWeight="bold" tts:backgroundColor="#00000000" tts:fontSize="45px">
   <p   region="r1"   begin="00:00:06:00"   end="00:00:07:00"   tts:backgroundColor="#00000000"
tts:fontStyle="italic"   tts:textOutline="red   1.35px"   textEdge=" raised"   tts:textDecoration="underline"
tts:fontWeight="bold"       tts:backgroundColor="green"      tts:fontSize="120px"  tts:direction=" ltr"
tts:lineHeight=" 120px"   tts:textAlign=" start"     tts:unicodeBidi=" normal"    tts:color="  #ff0000ff"
tts:fontFamily=" default"    presentation=" painton"  presentationrate=" auto" >6</p>
  </div>
 </body>
</region>
```

REPRODUCING DEVICE, REPRODUCING METHOD, PROGRAM, AND TRANSMITTING DEVICE

CROSS-REFERENCE TO RELATED APPLICATION

This application is a continuation of U.S. application Ser. No. 18/452,113, filed Aug. 18, 2023, which is a continuation of U.S. application Ser. No. 17/680,640, filed Feb. 25, 2022 (now U.S. Pat. No. 11,736,759), which is a continuation U.S. application Ser. No. 16/360,633, filed Mar. 21, 2019, which is a continuation of U.S. application Ser. No. 15/715,854, filed Sep. 26, 2017 (now U.S. Pat. No. 10,313,741), which is a continuation of U.S. application Ser. No. 14/868,036, filed Sep. 28, 2015 (now U.S. Pat. No. 9,807,449), which is a continuation of U.S. application Ser. No. 13/937,702, filed Jul. 9, 2013 (now U.S. Pat. No. 9,173,004), which claims the benefit of priority of Provisional Application No. 61/807,926, filed Apr. 3, 2013, the entire contents of each of which are incorporated herein by reference.

BACKGROUND

The present disclosure relates to a reproducing device, a reproducing method, a program, and a transmitting device, and particularly to a reproducing device, a reproducing method, a program, and a transmitting device that are compliant with CFR 47 Part 79 relating to closed captions of IP (Internet Protocol)-distributed contents, which CFR 47 Part 79 is included in the Code of Federal Regulations (CFR) defined by the Federal Communications Commission (FCC) of the United States of America.

CFR 47 Part 79 specifies that from Sep. 30, 2013 onward, a video of contents broadcast on television in the United States and IP-distributed must be provided with closed captions (hereinafter referred to as captions) in an equivalent manner to the contents at the time of being broadcast on television. It is also specified that reproducing devices configured to reproduce the contents which reproducing devices are sold in (or imported into) the United States from the same day onward must also display the captions.

Further, it is specified that from Jan. 1, 2014 onward, reproducing devices sold in (or imported into) the United States must implement the following functions relating to the display of captions (see http://www.fcc.gov/, for example).

(1) A function allowing a user to select a roll-up mode, a paint-on mode, or a pop-on mode as a display mode for captions (2) A function allowing a user to select the color of characters of captions (3) A function allowing a user to select the transparency of characters of captions (4) A function allowing a user to select the size of characters of captions (5) A function allowing a user to select the font face of captions (6) A function allowing a user to select the background color of captions and transparency thereof (7) A function allowing a user to select the edges of characters of captions (8) A function allowing a user to select the color of the background of captions While a method adopted to incorporate the above functions into a reproducing device is arbitrary, the FCC cites the use of SMPTE-TT documents (hereinafter referred to simply as SMPTE-TT) as the method.

An SMPTE-TT is a document of a timed-text format defined by SMPTE (Society of Motion Picture and Television Engineers), and specifies definitions of elements and attributes used to describe information on captions in XML (Extensible Markup Language) and a decoding method therefor (see https://www.smpte.org/).

SUMMARY

As described above, the use of an SMPTE-TT is considered in order to incorporate the functions defined in CFR 47 Part 79 into reproducing devices. However, the above-described functions of (1) and (7) are not specified in a current SMPTE-TT. An SMPTE-TT therefore needs to be extended in relation to these functions.

The present disclosure has been made in view of such a situation. It is desirable to provide a reproducing device in which the functions defined in CFR 47 Part 79 are incorporated.

According to a first mode of the present disclosure, there is provided a reproducing device including: a receiving section configured to receive IP-distributed content data and caption data corresponding to the content data; a content decoding section configured to generate a content video signal on a basis of the content data; an input section configured to input a user setting adopted to select at least one of a display mode and an edge of a character in relation to a caption; a retaining section configured to retain the input user setting; a caption information analyzing section configured to separate the caption data in time series, and generate intermediate caption information describing information on the caption in each display timing; an updating section configured to overwrite and update the intermediate caption information on a basis of the retained user setting; a caption video signal generating section configured to generate a caption video signal according to the overwritten and updated intermediate caption information; and a synthesizing section configured to superimpose and synthesize the caption video signal on the content video signal.

The caption data can be an extended SMPTE-TT, and the intermediate caption information can be an intermediate synchronic document.

The input section can input a user setting to select a roll-up mode, a paint-on mode, or a pop-on mode as an option for the display mode of the caption.

The input section can further input a user setting to specify a drawing rate when the roll-up mode or the paint-on mode is selected as the display mode of the caption.

The input section can input a user setting to select a right drop shadow edge, a raised edge, a depressed edge, or a uniform edge as an option for the edge of the character of the caption.

The retaining section can retain the user setting in a volatile region and a nonvolatile region, and the updating section can overwrite and update the intermediate caption information on the basis of the user setting retained in the nonvolatile region before reproduction of the content data and overwrite and update the intermediate caption information on the basis of the user setting retained in the volatile region during the reproduction of the content data.

According to the first mode of the present disclosure, there is provided a reproducing method of a reproducing device configured to receive and reproduce IP-distributed content data, the reproducing method including: by the reproducing device, a receiving step of receiving the content data and caption data corresponding to the content data; a content decoding step of generating a content video signal on a basis of the content data; a caption information analyzing step of separating the caption data in time series, and generating intermediate caption information describing information on a caption in each display timing; a retaining step of retaining a user setting to select at least one of a display mode and an edge of a character in relation to the caption; an updating step of overwriting and updating the intermediate caption information on a basis of the retained user setting; a caption video signal generating step of generating a caption video signal according to the overwritten and updated intermediate caption information; and a synthesizing step of superimposing and synthesizing the caption video signal on the content video signal.

According to the first mode of the present disclosure, there is provided a program used to make a computer function as: a receiving section configured to receive IP-distributed content data and caption data corresponding to the content data; a content decoding section configured to generate a content video signal on a basis of the content data; an input section configured to input a user setting adopted to select at least one of a display mode and an edge of a character in relation to a caption; a retaining section configured to retain the input user setting; a caption information analyzing section configured to separate the caption data in time series, and generate intermediate caption information describing information on the caption in each display timing; an updating section configured to overwrite and update the intermediate caption information on a basis of the retained user setting; a caption video signal generating section configured to generate a caption video signal according to the overwritten and updated intermediate caption information; and a synthesizing section configured to superimpose and synthesize the caption video signal on the content video signal.

In the first mode of the present disclosure, IP-distributed content data and caption data corresponding to the content data are received, a content video signal is generated on a basis of the content data, the caption data is separated in time series and intermediate caption information describing information on a caption in each display timing is generated, a user setting to select at least one of a display mode and an edge of a character in relation to the caption is retained, the intermediate caption information is overwritten and updated on a basis of the retained user setting, a caption video signal is generated according to the overwritten and updated intermediate caption information, and the caption video signal is superimposed and synthesized on the content video signal.

According to a second mode of the present disclosure, there is provided a transmitting device configured to transmit caption data corresponding to IP-distributed content data, wherein the caption data is an extended SMPTE-TT to which an item of specifying at least one of a display mode of a caption and an edge of a character is added.

In the second mode of the present disclosure, the extended SMPTE-TT to which the item of specifying at least one of the display mode of a caption and the edge of a character is added is transmitted as the caption data.

According to the first mode of the present disclosure, it is possible to realize a reproducing device in which the functions defined in CFR 47 Part 79 are incorporated.

According to the second mode of the present disclosure, it is possible to IP-distribute contents compliant with the regulations of CFR 47 Part 79 and caption data corresponding to the contents.

BRIEF DESCRIPTION OF THE DRAWINGS

FIG. 4 is a diagram of assistance in explaining a description of an intermediate synchronic document corresponding to a display mode paint-on;

FIG. 7 is a diagram showing an example of an optimized SMPTE-TT;

FIG. 8 is a diagram showing an example of an intermediate synchronic document separated from the SMPTE-TT of FIG. 7;

FIG. 9 is a diagram showing an example of an intermediate synchronic document subjected to style processing;

FIG. 10 is a diagram showing an example of an intermediate synchronic document subjected to computed style processing;

FIG. 11 is a diagram showing an example of an intermediate synchronic document in which user settings are overwritten and updated;

FIG. 12 is a diagram showing an example of the intermediate synchronic document in which user settings are overwritten and updated.

DETAILED DESCRIPTION OF THE PREFERRED EMBODIMENT

A best mode for carrying out the present disclosure (which best mode will hereinafter be referred to as an embodiment) will hereinafter be described in detail with reference to the drawings.

Embodiment

Example of Configuration of Reproducing Device

Figure 1:
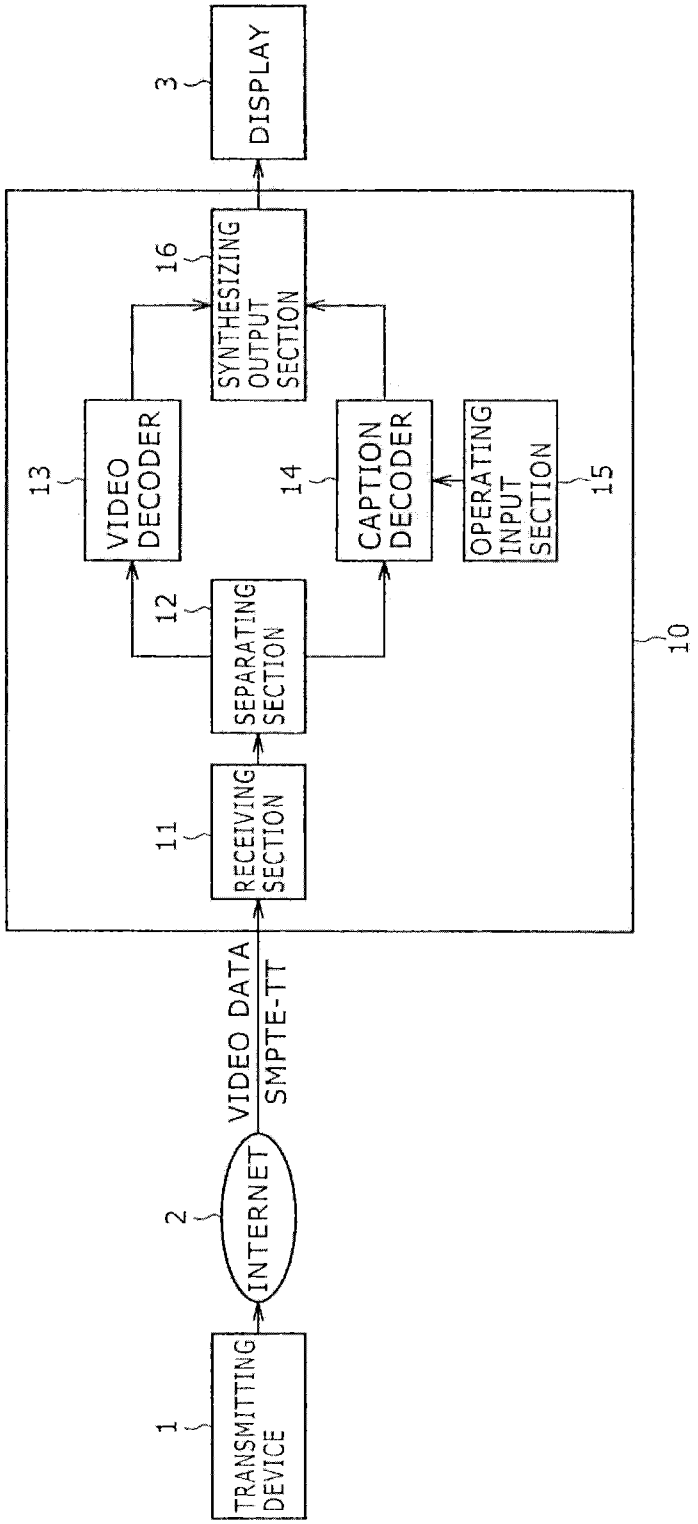
FIG. 1 is a block diagram showing an example of configuration of a reproducing device according to an embodiment of the present disclosure.

FIG. 1 shows an example of configuration of a reproducing device as an embodiment of the present disclosure. The reproducing device 10 has the above-described functions of (1) to (8) defined in CFR 47 Part 79. The reproducing device 10 receives video data of contents IP-distributed from a transmitting device 1 via an Internet 2 and an extended SMPTE-TT in which caption information corresponding to the video data is described, decodes each of the video data and the SMPTE-TT, and displays a caption in a state of being superimposed on a video of the contents.

The reproducing device 10 includes a receiving section 11, a separating section 12, a video decoder 13, a caption decoder 14, an operating input section 15, and a synthesizing output section 16.

The receiving section 11 receives IP packets storing the video data of the contents and the SMPTE-TT, and outputs the video data of the contents and the SMPTE-TT to the separating section 12. The separating section 12 separates the video data of the contents and the SMPTE-TT from each other, and outputs the video data to the video decoder 13 and outputs the SMPTE-TT to the caption decoder 14. The video decoder 13 decodes the video data, and outputs a resulting content video signal to the synthesizing output section 16.

The caption decoder 14 analyzes and retains the SMPTE-TT. In addition, the caption decoder 14 rewrites Intermediate Synchronic Documents (hereinafter abbreviated to ISDs) extracted from the SMPTE-TT according to settings relating to captions from a user, generates a caption video signal according to the ISDs, and outputs the caption video signal to the synthesizing output section 16.

The operating input section 15 receives various kinds of setting operations relating to captions from the user, and notifies setting information to the caption decoder 14. The synthesizing output section 16 superimposes and synthesizes the caption video signal from the caption decoder 14 on the content video signal from the video decoder 13, and outputs the result to a display 3 in a subsequent stage.

Figure 2:
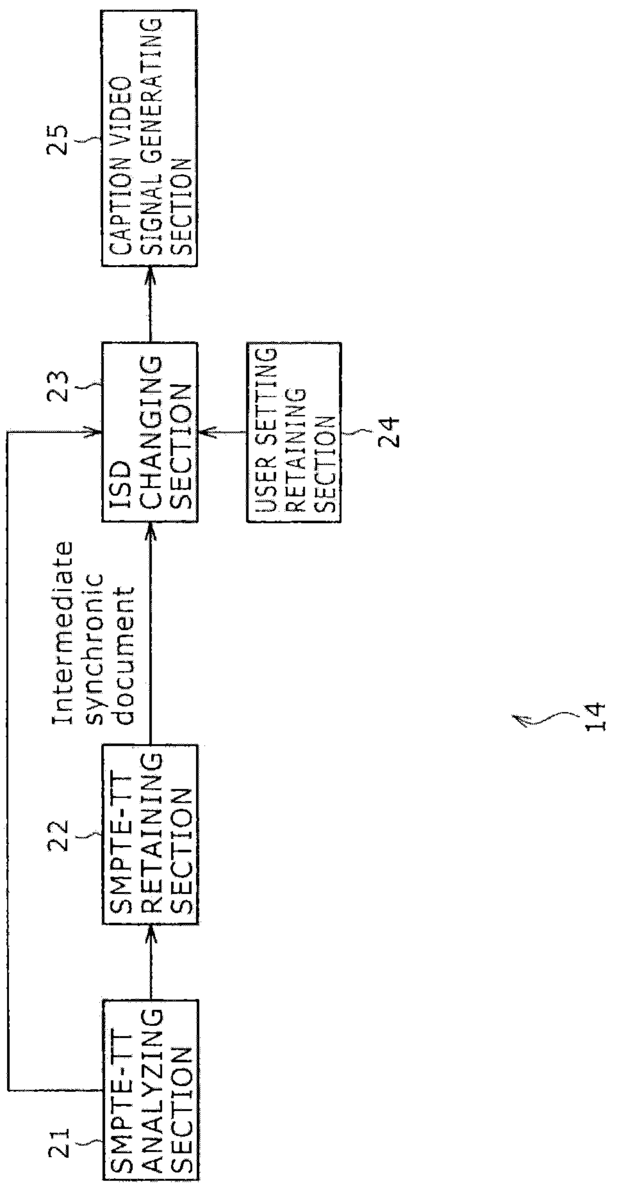
FIG. 2 is a block diagram showing an example of configuration of a caption decoder in FIG. 1.

FIG. 2 shows an example of a detailed configuration of the caption decoder 14 of FIG. 1. The caption decoder 14 includes an SMPTE-TT analyzing section 21, an SMPTE-TT retaining section 22, an ISD changing section 23, a user setting retaining section 24, and a caption video signal generating section 25.

The SMPTE-TT analyzing section 21 analyzes the SMPTE-TT input from the separating section 12 and described in XML, and notifies the display timing of a caption to the ISD changing section 23. The SMPTE-TT analyzing section 21 also optimizes the SMPTE-TT. Specifically, the SMPTE-TT analyzing section 21 for example removes information (copyright information and the like) unnecessary for the display of the caption from the SMPTE-TT. The SMPTE-TT retaining section 22 retains the optimized SMPTE-TT.

Figure 3:
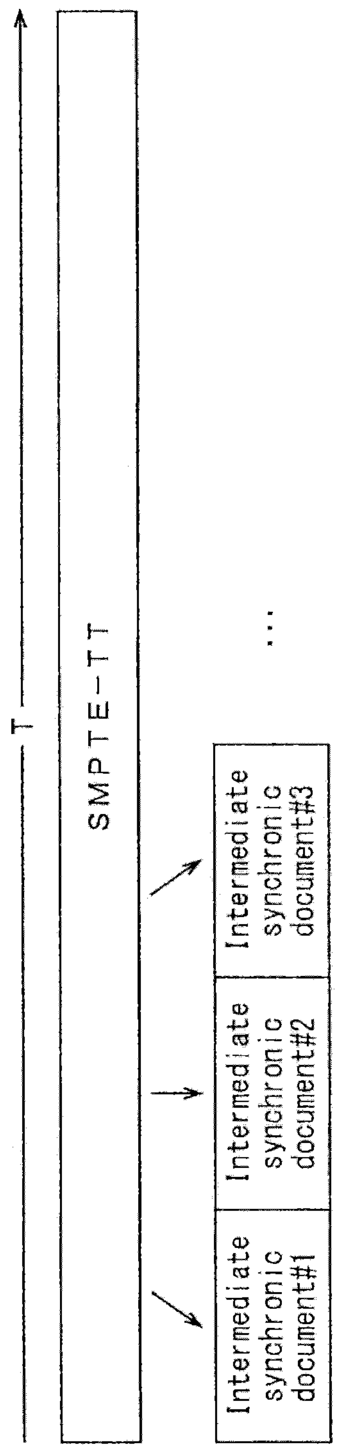
FIG. 3 is a diagram showing an image of separating an SMPTE-TT in time series and generating an intermediate synchronic document.

As shown in FIG. 3, the ISD changing section 23 separates the SMPTE-TT in time series, and reads ISDs as caption information corresponding to each display timing from the optimized SMPTE-TT retained in the SMPTE-TT retaining section 22. The ISD changing section 23 also performs style processing that defines attribute values of all elements of the ISDs and computed style processing that converts the attribute values of all the elements into values interpretable by the caption video signal generating section 25. The ISD changing section 23 further overwrites and updates the ISDs subjected to the computed style processing on the basis of user settings relating to captions, which user settings are retained by the user setting retaining section 24, and outputs the ISDs to the caption video signal generating section 25.

The user setting retaining section 24 retains setting information (user settings) selected in relation to caption display by the user by the above-described functions of (1) to (8) defined in CFR 47 Part 79. Incidentally, the user setting retaining section 24 has a volatile region in which retained information is erased when power to the reproducing device 10 is turned off and a nonvolatile region that continues retaining information even while the power is off. The volatile region retains user settings changed during reproduction of contents. The nonvolatile region retains initial values of the user settings selected by the user in advance.

The caption video signal generating section 25 generates a caption video signal on the basis of the ISDs updated on the basis of the user settings.

[Extension of SMPTE-TT and Updating of ISDs to Implement Above-Described Functions of (1) to (8) Defined in CFR 47 Part 79]

The function of (1) allows selection of either a roll-up mode, a paint-on mode, or a pop-on mode as an option for a display mode.

The roll-up mode is a display mode adopted to scroll a character string forming a caption up, down, left, or right. The paint-on mode is a display mode adopted to display a character string forming a caption on a character-by-character basis. Specifically, for example, when a character string "ABCD" of a caption is to be displayed finally, "A" is displayed in a first display timing, and thereafter "AB," "ABC," and "ABCD" are displayed in order. The pop-on mode is a display mode in related art in which a caption is displayed in a unit of a character string for one screen.

Figure 4:
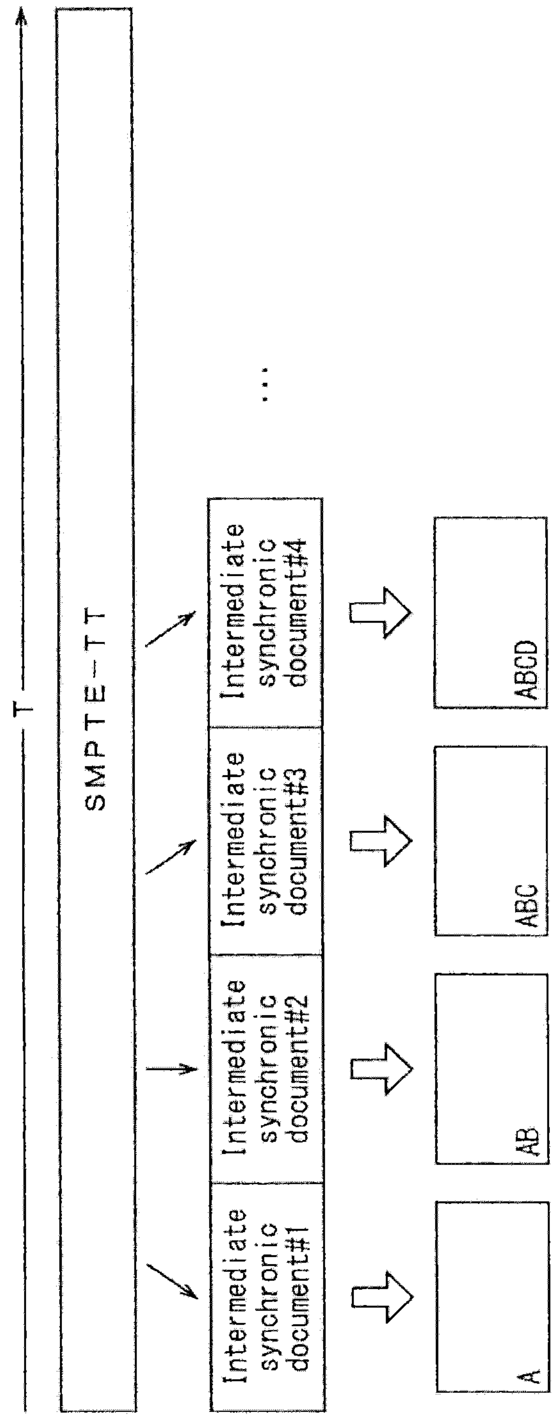

However, the SMPTE-TT in related art does not define display modes. Thus, when the paint-on mode is to be realized by the SMPTE-TT in related art, as shown in FIG. 4, information used to display the character string "A" is described in an ISD for a first display timing among the ISDs in time series of the SMPTE-TT, and information used to display "AB," "ABC," and "ABCD" is described in subsequent ISDs in order. Then, the caption can be displayed as a paint-on caption without a content reproducing side being aware of the display mode.

Similarly, when the roll-up mode is to be realized by the SMPTE-TT in related art, information indicating a character string displayed in each display timing is described in the ISDs in time series of the SMPTE-TT. Then, the caption can be displayed as a roll-up caption without the content reproducing side being aware of the display mode.

However, in the cases where the paint-on mode and the roll-up mode are realized by the SMPTE-TT in related art as described above, even when the user gives an instruction to change the display mode of the caption, the change cannot be made because the display mode is not grasped on the content reproducing side.

Accordingly, in the present embodiment, the SMPTE-TT is extended, and attributes (or elements) in XML are defined as follows, for example.

Attribute name: presentation
Value: popon|rollup|painton
Initial: popon
Applies to: region, div, p, span
Inheritable: yes
Percentage: —
Animatable: discrete This description specifies the display mode of an element.

Attribute name: presentationrate
Value: auto|<timeExpression>
Initial: auto
Applies to: region, div, p, span
Inheritable: no
Percentage: —
Animatable: no This description specifies the drawing rate of the roll-up mode or the paint-on mode. The description is invalid when the display mode is the pop-on mode.

An example of description <p begin="1s" end="5s" presentation="painton" presentationrate="1s">ABC</p>

In this example, characters of ABC displayed during the four seconds from the first second to the fifth second are displayed in the paint-on mode in each second. Specifically, "A" is displayed in the first second, "AB" is displayed in the second second, "ABC" is displayed in the third second, and "ABC" is displayed in the fourth second. Incidentally, when the value of the drawing rate is auto, the drawing rate is determined by the caption video signal generating section 25 of the reproducing device 10. Specifically, the drawing rate is determined so as to be a value obtained by dividing the display time by the number of characters of the character string, for example.

When the user changes the display mode of the caption, the presentation indicating the display mode in the ISDs is overwritten according to selection of the display mode by the user.

Further, a content author is prohibited from making description in the ISDs adopted to realize the roll-up mode or the paint-on mode described above, and information indicating the character string of the caption displayed simultaneously so as to correspond to the pop-on mode is described in the ISDs. Thereby, the display mode can be changed in arbitrary timing on the reproducing side.

The function of (2) allows the user to select the color of characters of a caption. In order to realize this, the attribute value of tts: color indicating the color of the characters described in the ISDs is overwritten with a value indicating the color set by the user.

The function of (3) allows the user to select the transparency of characters of a caption. In order to realize this, the attribute value of tts: color relating to the transparency of the characters described in the ISDs is overwritten with a value indicating the transparency set by the user. Incidentally, as a method for the user to set the transparency, a scaling factor for an initial value may be specified directly, or options provided in advance (high, medium, and low, for example) may be selected.

The function of (4) allows the user to select the size of characters of a caption. In order to realize this, the attribute value of tts: FontSize relating to the size of the characters described in the ISDs is overwritten with a value of a result of multiplying the attribute value by an enlarging scaling factor specified directly or selected by the user.

The function of (5) allows the user to select the font face of characters of a caption. In order to realize this, the attribute value of tts: fontFamily relating to the font face of the characters described in the ISDs is overwritten with information indicating the font face set by the user.

The function of (6) allows the user to select the background color of a caption and the transparency thereof. In order to realize this, the attribute value of tts: backgroundColor indicating the background color and the transparency thereof for characters described in the ISDs is overwritten with information indicating the background color and the transparency thereof set by the user. Incidentally, as a method for the user to set the transparency of the background color, a scaling factor for an initial value may be specified directly, or options provided in advance (high, medium, and low, for example) may be selected.

The function of (7) allows the user to select either a right drop shadow edge, a raised edge, a depressed edge, or a uniform edge as edges of characters of a caption.

Figure 5:
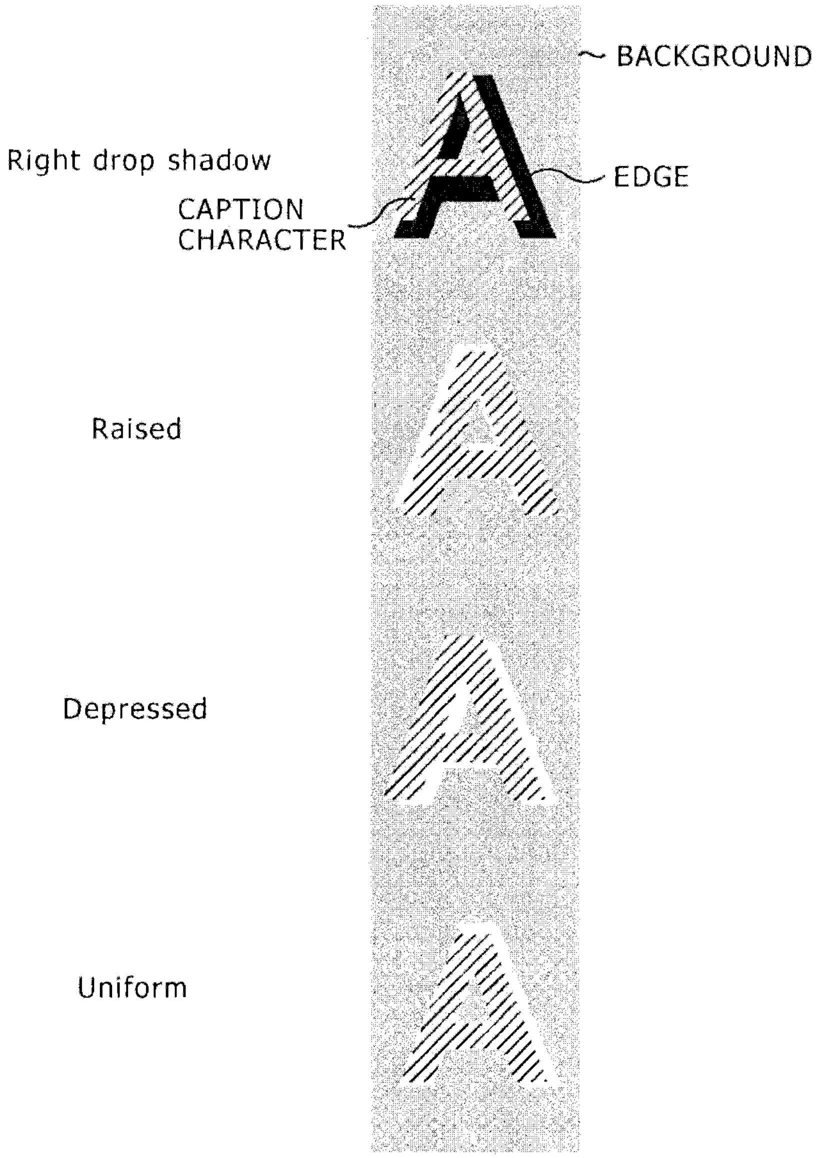
FIG. 5 is a diagram concretely showing options for the edge of a character of a caption.

FIG. 5 shows a concrete example of a right drop shadow edge, a raised edge, a depressed edge, and a uniform edge as options for edges of characters of a caption.

However, the SMPTE-TT in related art does not define edges of characters of captions. Thus, the SMPTE-TT is extended, and an attribute (or an element) in XML is defined as follows, for example.

Attribute name: textEdge
Value: rightdropshadow|raised|depressed|uniform
Initial: uniform
Applies to: span
Inheritable: yes
Percentage: —
Animatable: discrete Textedge is used as auxiliary information for tts: textOutline. Textedge is meaningless when the value of textOutline is none. A character drawn by textOutline is provided with an edge according to a specification.

An example of description <p begin="1s" end="3s" tts: textOutline="red 3%" textEdge="raised">AAA</p>

The textOutline indicates the color of the edge and the width of the edge with respect to the original character. The textEdge indicates a kind of edge of the character.

When the user changes the edges of characters of a caption, the textEdge in the ISDs is overwritten according to a selection by the user.

The function of (8) allows the user to select the color of the background of a caption. In order to realize this, the attribute value of tts: backgroundColor indicating the color of the background of the caption described in the ISDs is overwritten with information indicating the color set by the user.

[Description of Operation]

Figure 6:
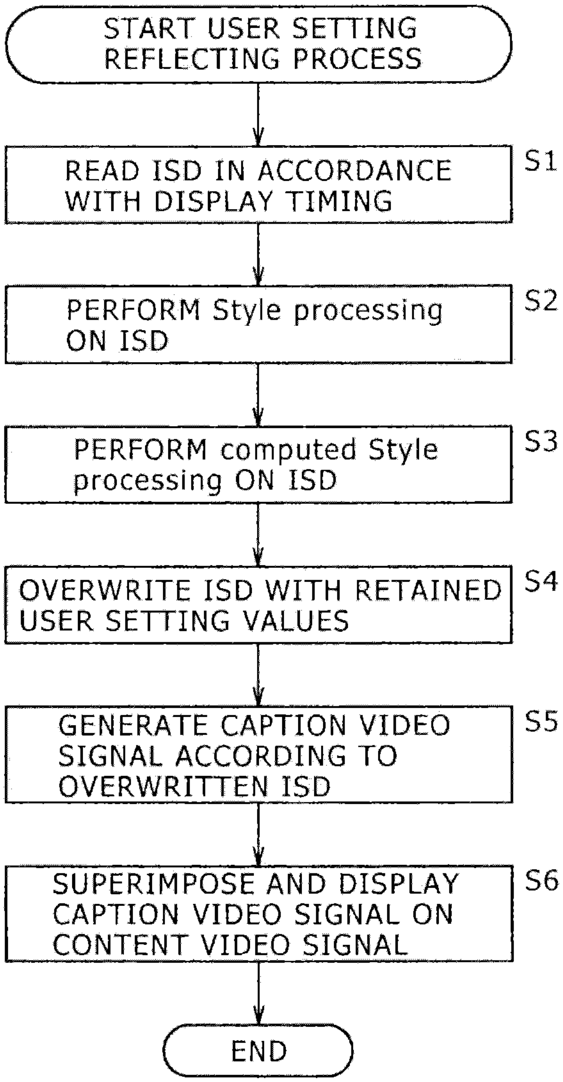
FIG. 6 is a flowchart of assistance in explaining a user setting reflecting process.

FIG. 6 is a flowchart of assistance in explaining a series of processes up to the display of a caption in such a manner as to reflect user settings relating to the caption (which series of processes will hereinafter be referred to as a user setting reflecting process) in the reproducing device 10.

Incidentally, as a precondition for the user setting reflecting process, the reproducing device 10 has started receiving IP-distributed video data and an extended SMPTE-TT, and has input the video data to the video decoder 13 and input the SMPTE-TT to the caption decoder 14. Further, suppose that an optimized SMPTE-TT is retained in the SMPTE-TT retaining section 22 of the caption decoder 14.

In step S1, the ISD changing section 23 of the caption decoder 14 reads an ISD corresponding to display timing of a caption from the SMPTE-TT retaining section 22 on the basis of a notification of the display timing from the SMPTE-TT analyzing section 21.

The ISD changing section 23 performs style processing on the read ISD in step S2, and performs computed style processing on the read ISD in step S3.

In step S4, the ISD changing section 23 overwrites and updates the ISD subjected to the computed style processing on the basis of user settings retained by the user setting retaining section 24, and outputs the ISD to the caption video signal generating section 25. Incidentally, the ISD is updated on the basis of the initial values of the user settings in the nonvolatile region of the user setting retaining section 24 before reproduction of contents and on the basis of the user settings in the volatile region of the user setting retaining section 24 during the reproduction of the contents.

In step S5, the caption video signal generating section 25 generates a caption video signal on the basis of the ISD updated on the basis of the user settings. The caption video signal is output to the synthesizing output section 16. In step S6, the synthesizing output section 16 superimposes and synthesizes the caption video signal input from the caption decoder 14 on a content video signal input from the video decoder 13, and outputs to the display 3 in the subsequent stage. This concludes the description of the user setting reflecting process.

An example up to the overwriting and updating of the ISD of the optimized SMPTE-TT on the basis of user settings will next be described with reference to FIGS. 7 to 12.

FIG. 7 shows an example of the optimized SMPTE-TT retained in the SMPTE-TT retaining section 22. This SMPTE-TT corresponds to a content reproduction time of eight seconds, and when separated in time series, becomes eight ISDs each corresponding to display timing of a period of one second.

FIG. 8 represents an ISD corresponding to a time from the sixth second to the seventh second of the content reproduction time, which ISD is separated from the SMPTE-TT in FIG. 7.

FIG. 9 shows a state resulting from performing style processing on the ISD shown in FIG. 8. In the ISD subjected to the style processing which ISD is shown in FIG. 9, descriptions of parts underlined with a broken line are attribute values inherited from the parent div of the div of the ISD, and descriptions of parts underlined with a solid line are attribute values in which default values are set because of the absence of specifications.

FIG. 10 shows a state resulting from performing computed style processing on the ISD subjected to the style processing which ISD is shown in FIG. 9. In the ISD subjected to the computed style processing which ISD is shown in FIG. 10, descriptions of parts underlined with a solid line are values interpretable by the caption video signal generating section 25 which values are converted from attribute values.

FIG. 11 shows a state in which the ISD subjected to the computed style processing which ISD is shown in FIG. 10 is overwritten and updated with the following user settings.

User Settings

Red for the color of a caption character and completely opaque for the transparency=tts: color="#ff0000ff"

120px as the size of the caption character tts: fontSize="120px"

Font face of the caption character is a default=tts: fontFamily="default"

Completely transparent for the background color and transparency of the caption=tts: backgroundColor="#00000000"

Completely transparent for the color of the background of the caption=tts: backgroundColor="#00000000"

Incidentally, descriptions of parts underlined with a solid line are parts overwritten with the user settings.

FIG. 12 shows a state in which the attributes presentation and presentationrate indicating the display mode and the drawing rate of the caption and the attribute textEdge indicating the edge of the caption character are added to the ISD shown in FIG. 10. Incidentally, these additions are made by the content author. When these additions are rewritten according to the user settings in the ISD changing section 23 of the reproducing device 10, descriptions of parts underlined with a solid line are rewritten.

The series of processes of the reproducing device 10 described above can be carried out not only by hardware but also by software. When the series of processes is to be carried out by software, a program constituting the software is installed onto a computer. In this case, the computer includes a computer incorporated in dedicated hardware, a general-purpose personal computer, for example, that can perform various kinds of functions by installing various kinds of programs thereon, and the like.

Figure 13:
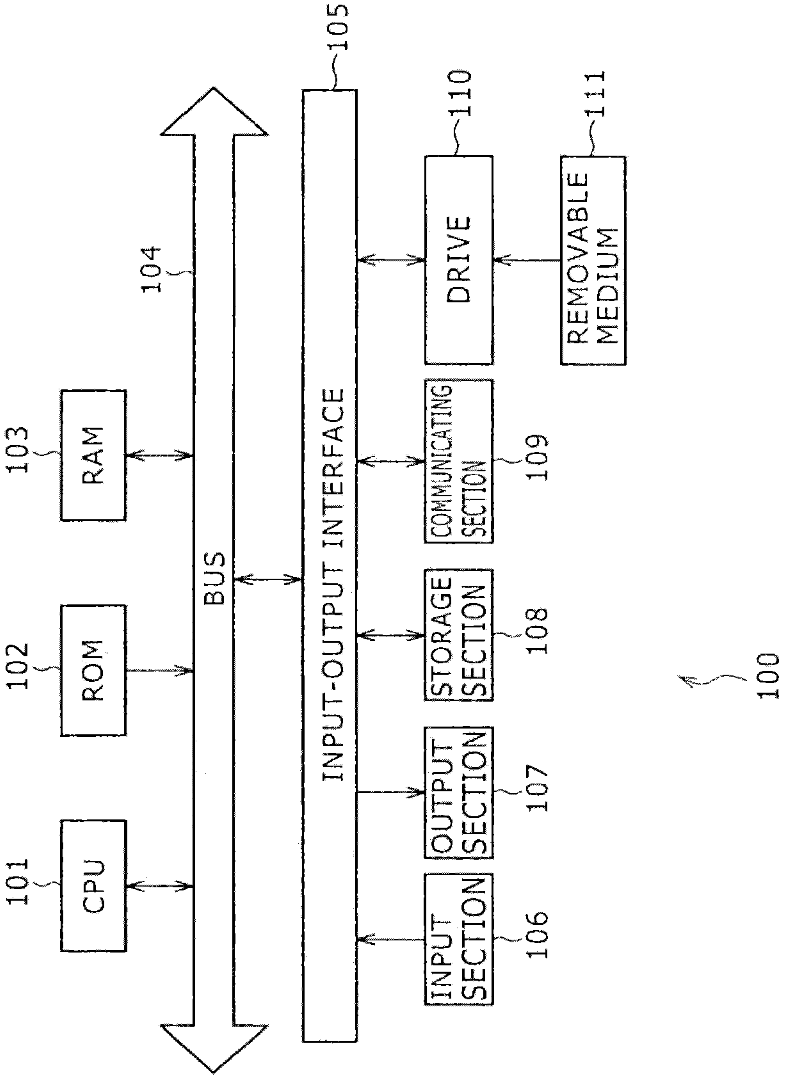
FIG. 13 is a block diagram showing an example of configuration of a computer.

FIG. 13 is a block diagram showing an example of hardware configuration of a computer performing the series of processes described above by a program.

In a computer 100, a CPU (Central Processing Unit) 101, a ROM (Read Only Memory) 102, and a RAM (Random Access Memory) 103 are interconnected by a bus 104.

The bus 104 is further connected with an input-output interface 105. The input-output interface 105 is connected with an input section 106, an output section 107, a storage section 108, a communicating section 109, and a drive 110.

The input section 106 includes a keyboard, a mouse, a microphone, and the like. The output section 107 includes a display, a speaker, and the like. The storage section 108 includes a hard disk, a nonvolatile memory, and the like. The communicating section 109 includes a network interface and the like. The drive 110 drives a removable medium 111 such as a magnetic disk, an optical disk, a magneto-optical disk, or a semiconductor memory.

In the computer 100 configured as described above, the CPU 101 for example loads a program stored in the storage section 108 into the RAM 103 via the input-output interface 105 and the bus 104, and then executes the program. Thereby the series of processes described above is performed.

It is to be noted that the program executed by the computer 100 may be a program adopted to perform the processes in time series in the order described in the present specification, or may be a program adopted to perform the processes in parallel or in necessary timing such as at a time that a call is made.

Embodiments of the present disclosure are not limited to the foregoing embodiment, but are susceptible of various changes without departing from the spirit of the present disclosure.

What is claimed is:

1. A reproducing apparatus, comprising:
- a memory; and
- circuitry coupled to the memory and configured to
  - receive content data and caption data, the caption data corresponding to the content data,
  - generate a content video signal based on the content data,
  - generate caption information based on the caption data,
  - display caption character edge type options including a drop shadow edge, a raised edge, a depressed edge and a uniform edge,
  - receive a first user setting to select a first caption character edge type option from the caption character edge type options,
  - retain the first user setting in the memory,
  - update the caption information based on the first user setting,
  - generate a caption video signal according to the updated caption information,
  - superimpose the caption video signal on the content video signal and reproduce the content video signal and the superimposed caption video signal,
  - during reproduction of the content video signal, display the caption character edge type options and receive a second user setting to select a second caption character edge type option from the caption character edge type options,
  - retain the second user setting in the memory, and
  - update the caption information based on the second user setting.

2. The reproducing apparatus according to claim 1, wherein the caption information is an intermediate caption information.

3. The reproducing apparatus according to claim 2, wherein
- the caption data have elements defined in Extensible Markup Language (XML).

4. The reproducing apparatus according to claim 3, wherein the circuitry is further configured to receive the first user setting and the second user setting to select a caption character edge type of the caption information.

5. The reproducing apparatus according to claim 4, wherein the circuitry is further configured to receive the first user setting and the second user setting to select the drop shadow edge, the raised edge, the depressed edge, or the uniform edge as an option of the caption character edge type.

6. The reproducing apparatus according to claim 5, wherein the circuitry is further configured to receive the second user setting to select the caption character edge type during reproduction of the content video signal together with the superimposed caption video signal.

7. The reproducing apparatus according to claim 4, wherein the caption data is an SMPTE-TT (document of a timed-text format defined by Society of Motion Picture and Television Engineers), and the intermediate caption information is an intermediate synchronic document.

8. The reproducing apparatus according to claim 3, wherein the circuitry is further configured to receive the first user setting and the second user setting to select a caption display mode.

9. The reproducing apparatus according to claim 8, wherein the circuitry is further configured to receive the first user setting and the second user setting to select a roll-up mode, a paint-on mode, or a pop-on mode as an option of the caption display mode.

10. The reproducing apparatus according to claim 8, wherein the caption data is an SMPTE-TT (document of a timed-text format defined by Society of Motion Picture and Television Engineers), and the intermediate caption information is an intermediate synchronic document.

11. The reproducing apparatus according to claim 3, wherein the circuitry is further configured to update the intermediate caption information on a basis of the retained first user setting in the memory before reproduction of the content video signal.

12. The reproducing apparatus according to claim 3, wherein the circuitry is further configured to update the intermediate caption information on a basis of the retained first user setting in the memory before reproduction of the content video signal, and update the intermediate caption information on a basis of the retained second user setting in the memory during the reproduction of the content video signal.

13. The reproducing apparatus according to claim 1, wherein the circuitry is further configured to receive the first user setting and the second user setting to select a caption character edge type.

14. The reproducing apparatus according to claim 13, wherein the circuitry is further configured to receive the first user setting and the second user setting to select the drop shadow edge, the raised edge, the depressed edge, or the uniform edge as the caption character edge type.

15. The reproducing apparatus according to claim 14, wherein the circuitry is further configured to receive the second user setting to select the caption character edge type during reproduction of the content video signal together with the superimposed caption video signal.

16. The reproducing apparatus according to claim 1, wherein the circuitry is further configured to receive the first user setting and the second user setting to select a caption display mode.

17. The reproducing apparatus according to claim 16, wherein the circuitry is further configured to receive the first user setting and the second user setting to select a roll-up mode, a paint-on mode, or a pop-on mode as an option of the caption display mode.

18. The reproducing apparatus according to claim 1, wherein the circuitry is further configured to update the caption information on a basis of the retained first user setting in the memory before reproduction of the content video signal.

19. The reproducing apparatus according to claim 1, wherein the circuitry is further configured to update the caption information on a basis of the retained first user setting in the memory before reproduction of the content video signal, and update the caption information on a basis of the retained second user setting in the memory during the reproduction of the content video signal.

20. A reproducing method, comprising:

receiving content data and caption data, the caption data corresponding to the content data;

generating a content video signal based on the content data;

generating caption information based on the caption data;

displaying caption character edge type options including a drop shadow edge, a raised edge, a depressed edge and a uniform edge receiving a first user setting to select a first caption character edge type option from the caption character edge type options;

retaining the first user setting at least in memory;

updating the caption information based on the first user setting;

generating a caption video signal according to the updated caption information;

superimposing the caption video signal on the content video signal and reproducing the content video signal and the superimposed caption video signal;

during reproduction of the content video signal, displaying the caption character edge type options and receiving a second user setting to select a second caption character edge type option from the caption character edge type options;

retaining the second user setting at least in memory; and updating the caption information based on the second user setting.

21. The reproducing apparatus according to claim 1, wherein the circuitry is further configured to retain the first user setting in a non-volatile memory region and to retain the second user setting in a volatile memory region.

* * * * *